(12) United States Patent
Wang

(10) Patent No.: US 11,226,508 B2
(45) Date of Patent: Jan. 18, 2022

(54) FLEXIBLE SUBSTRATE, MANUFACTURING METHOD THEREOF, AND FLEXIBLE DISPLAY DEVICE

(71) Applicant: TCL CHINA STAR OPTOELECTRONICS TECHNOLOGY CO., LTD., Shenzhen (CN)

(72) Inventor: Yanan Wang, Shenzhen (CN)

( * ) Notice: Subject to any disclaimer, the term of this patent is extended or adjusted under 35 U.S.C. 154(b) by 181 days.

(21) Appl. No.: 16/626,356

(22) PCT Filed: Dec. 11, 2019

(86) PCT No.: PCT/CN2019/124592
§ 371 (c)(1),
(2) Date: Dec. 24, 2019

(87) PCT Pub. No.: WO2020/238146
PCT Pub. Date: Dec. 3, 2020

(65) Prior Publication Data
US 2021/0333609 A1    Oct. 28, 2021

(30) Foreign Application Priority Data
May 27, 2019   (CN) .......................... 201910448195.9

(51) Int. Cl.
*G02F 1/1333*     (2006.01)
*G02F 1/1337*     (2006.01)
(Continued)

(52) U.S. Cl.
CPC .. *G02F 1/133305* (2013.01); *G02F 1/133738* (2021.01); *G02F 1/133742* (2021.01); *G02F 1/133757* (2021.01); *G02F 1/134309* (2013.01); *G02F 1/13712* (2021.01); *G02F 1/133362* (2013.01)

(58) Field of Classification Search
CPC ............. G02F 1/1337; G02F 1/133753; G02F 1/133757; G02F 1/134345; G02F 1/133742; G02F 1/1343; G02F 1/134309; G02F 1/1333; G02F 1/133738; G02F 1/13775; G02F 1/133351; G02F 1/133362;
(Continued)

(56) References Cited

U.S. PATENT DOCUMENTS 10,649,251 B2 * 5/2020 Seo ................... G02F 1/133707
2017/0031188 A1 * 2/2017 Li ..................... G02F 1/133514

* cited by examiner

*Primary Examiner* — Thoi V Duong

(57) ABSTRACT

The disclosure provides a flexible substrate, a manufacturing method thereof, and a flexible display device. The flexible substrate includes a cell and a plurality of liquid crystal molecules disposed in the cell. The cell includes a plurality of sub-pixel display areas arranged in an array and a non-display area disposed outside the sub-pixel display areas. The liquid crystal molecules are disposed in each of the sub-pixel display areas and the non-display area, extending directions of the liquid crystal molecules in each of the sub-pixel display areas are perpendicular to a plane on which the flexible substrate is disposed, and extending directions of the liquid crystal molecules in the non-display area are parallel to the plane on which the flexible substrate is disposed. Risk of damage to electrically driven devices in the flexible display device having the flexible substrate can be reduced. As a result, reliability of products is improved.

9 Claims, 15 Drawing Sheets

(51) Int. Cl.
*G02F 1/1343* (2006.01)
*G02F 1/137* (2006.01)

(58) Field of Classification Search
CPC ............. G02F 1/133305; G02F 1/1334; G02F 1/13712; G02F 2201/123; G02F 2201/122
See application file for complete search history.

FLEXIBLE SUBSTRATE, MANUFACTURING METHOD THEREOF, AND FLEXIBLE DISPLAY DEVICE

FIELD

The present disclosure relates to the field of display technology and, more particularly, relates to a flexible substrate, a manufacturing method thereof, and a flexible display device.

BACKGROUND

In the field of display technology, cathode ray tube (CTR) display devices are gradually replaced by flat panel display devices such as liquid crystal displays (LCDs) and organic light-emitting diode (OLED) display devices which have a wide range of applications.

Most LCD devices in current market are backlit LCD devices that include an LCD panel and a backlight module. Typically, the LCD panel is a combination of a color filter (CF) substrate, a thin film transistor (TFT) array substrate, liquid crystals therebetween, and a sealant. A working principle of LCD panels is: liquid crystal molecules are disposed between two glass substrates which are parallel to each other, multiple vertical and horizontal small currents exist between the two glass substrates, and orientations of the liquid crystal molecules can be controlled by applying a voltage to the two glass substrates; therefore, light emitted from a backlight module can be refracted to generate images.

OLEDs generally includes a substrate, an anode disposed on the substrate, a hole injection layer (HIL) disposed on the anode, a hole transport layer (HTL) disposed on the HIL, a luminescent layer disposed on the HTL, an electron transport layer (ETL) disposed on the luminescent layer, an electron injection layer (EIL) disposed on the ETL, and a cathode disposed on the EIL. A working principle of OLED devices is: driven by an electric field, charge carriers are injected, pass through semiconductor materials, and recombine in a luminescent layer having organic luminescent materials to emit light.

With continuous development of display technology, flexible display devices attract increasing attention from consumers. Typically, deformation property of an entire flexible display device is uniform; therefore, when uneven external forces are applied to the flexible display device, different positions of the flexible display device have different deformation quantities, thereby reducing brightness uniformity in different positions. Furthermore, electrically driven devices in the flexible display devices may be severely damaged because of stretch and compression of the flexible display devices, resulting in display abnormality.

SUMMARY

An objective of the present disclosure is to provide a flexible substrate. Deformation of a non-display area in the flexible display device having the flexible substrate can be reduced when the non-display area is bent, thereby ensuring reliability of the flexible display device.

Another objective of the present disclosure is to provide a manufacturing method of a flexible substrate. Deformation of a non-display area in the flexible display device having the flexible substrate can be reduced when the non-display area is bent, thereby ensuring reliability of the flexible display device.

Yet another objective of the present disclosure is to provide a flexible display device. Deformation of a non-display area can be reduced when the non-display area is bent, thereby ensuring reliability of a flexible display device.

To achieve the above goals, the present disclosure provides a flexible substrate, including a cell and a plurality of liquid crystal molecules disposed in the cell. The cell includes a plurality of sub-pixel display areas arranged in an array and a non-display area disposed outside the sub-pixel display areas. The liquid crystal molecules are disposed in each of the sub-pixel display areas and the non-display area. Extending directions of the liquid crystal molecules in each of the sub-pixel display areas are perpendicular to a plane on which the flexible substrate is disposed, and extending directions of the liquid crystal molecules in the non-display area are parallel to the plane on which the flexible substrate is disposed.

The extending directions of the liquid crystal molecules in the non-display area are parallel to a row direction or a column direction of the sub-pixel display areas.

The non-display area includes a first sub-area and a second sub-area which are sequentially disposed along a direction perpendicular to the plane on which the flexible substrate is disposed. The liquid crystal molecules are disposed in the first sub-area and the second sub-area. Extending directions of the liquid crystal molecules in the first sub-area are parallel to a row direction of the sub-pixel display areas, extending directions of the liquid crystal molecules in the second sub-area are parallel to a column direction of the sub-pixel display areas.

A material of the cell is a polymer.

The present disclosure further provides a method of manufacturing the above flexible substrate, including the following steps:

Step 1: providing two substrates, wherein each of the substrates includes a plurality of vertical alignment areas arranged in an array and a plurality of horizontal alignment areas disposed outside the vertical alignment areas.

Step 2: respectively forming an alignment layer on each of the substrates, wherein the alignment layer includes a first sub-alignment layer and a second sub-alignment layer which are sequentially disposed along a direction away from the substrate on which they are disposed, and the first sub-alignment layer corresponds to the vertical alignment areas and the horizontal alignment areas; and wherein the second sub-alignment layer corresponds to the vertical alignment areas, and the second sub-alignment layer is a vertical alignment layer and the first sub-alignment layer is a horizontal alignment layer; or wherein the second sub-alignment layer corresponds to the horizontal alignment areas, and the second sub-alignment layer is the horizontal alignment layer and the first sub-alignment layer is the vertical alignment layer.

Step 3: aligning the two alignment layers with each other and forming a liquid crystal material layer between the two alignment layers, wherein the liquid crystal material layer includes a plurality of liquid crystal molecules; by the two alignment layers, in the liquid crystal material layer, extending directions of the liquid crystal molecules corresponding to the vertical alignment areas are perpendicular to planes on which the substrates are respectively disposed, and extending directions of the liquid crystal molecules corresponding to the horizontal alignment areas are parallel to the planes on which the substrates are respectively disposed.

Step 4: curing the liquid crystal material layer to form the flexible substrate.

The method further includes Step 5: separating the flexible substrate from the two alignment layers.

The liquid crystal material layer includes a plurality of reactive monomers, a plurality of intermediates, and a plurality of photoinitiators.

The step of curing the liquid crystal material layer in the Step 4 includes: first heating the liquid crystal material layer at predetermined temperatures for predetermined times, then irradiating the liquid crystal material layer by ultraviolet light.

The predetermined temperatures range from 70° C. to 100° C., and the predetermined times range from 15 hours to 30 hours.

The second sub-alignment layer is formed by inkjet printing.

The present disclosure further provides a manufacturing method of the above flexible substrate, including the following steps:

Step 1': providing a first substrate and a second substrate, wherein the first substrate includes a plurality of vertical alignment areas arranged in an array and a plurality of horizontal alignment areas disposed outside the vertical alignment areas.

Step 2': forming a first electrode on the first substrate, forming a second electrode on the second substrate, and respectively forming a first vertical alignment layer and a second vertical alignment layer on a side of the first electrode away from the first substrate and on a side of the second electrode away from the second substrate, wherein the first electrode corresponds to the horizontal alignment areas, the second electrode at least corresponds to the horizontal alignment areas, and both the first vertical alignment layer and the second vertical alignment layer correspond to at least the vertical alignment areas.

Step 3': aligning the first vertical alignment layer with the second vertical alignment layer, and forming a liquid crystal material layer between the first vertical alignment layer and the second vertical alignment layer, wherein the liquid crystal material layer includes a plurality of liquid crystal molecules which are negative liquid crystal molecules.

Step 4': applying voltage to the first electrode and the second electrode and curing the liquid crystal material layer to form the flexible substrate, wherein by the first vertical alignment layer, the second vertical alignment layer, and an electric field between the first electrode and the second electrode, extending directions of the liquid crystal molecules in the liquid crystal material layer corresponding to the vertical alignment areas are perpendicular to a plane on which the first substrate is disposed, extending directions of the liquid crystal molecules in the liquid crystal material layer corresponding to the horizontal alignment areas are parallel to the plane on which the first substrate is disposed.

The method further includes: Step 5': separating the flexible substrate from the first vertical alignment layer and the second vertical alignment layer, The liquid crystal material layer includes a plurality of reactive monomers, a plurality of intermediates, and a plurality of photoinitiators.

The step of curing the liquid crystal material layer in the Step 4' includes: first irradiating the liquid crystal material layer by ultraviolet light, then heating the liquid crystal material layer at predetermined temperatures for predetermined times.

The predetermined temperatures range from 70° C. to 100° C., and the predetermined times range from 15 hours to 30 hours.

The present disclosure further provides a flexible display device, including the above flexible substrate.

The flexible display device is a liquid crystal display device or an organic light-emitting diode display device.

Regarding the beneficial effects: the present disclosure provides a flexible substrate, including a cell and a plurality of liquid crystal molecules disposed in the cell, wherein the cell includes a plurality of sub-pixel display areas arranged in an array and a non-display area disposed outside the sub-pixel display areas. The liquid crystal molecules are disposed in each of the sub-pixel display areas and the non-display area. Extending directions of the liquid crystal molecules in each of the sub-pixel display areas are perpendicular to a plane on which the flexible substrate is disposed, and extending directions of the liquid crystal molecules in the non-display area are parallel to the plane on which the flexible substrate is disposed. Therefore, bendability of the non-display area in the flexible substrate is improved, and flexibility of the sub-pixel display area is improved as well, which may effectively reduce deformation of the non-display area when the non-display area is bent. Risk of damage to electrically driven devices in a flexible display device having the flexible substrate can be reduced when the flexible display device is bent. As a result, reliability of products is improved. The present disclosure provides a manufacturing method of the flexible substrate, and deformation of the non-display area in the flexible display device having the flexible substrate can be reduced when the non-display area is bent, thereby ensuring reliability of the flexible display device. The present disclosure provides the flexible display device, and deformation of the non-display area can be reduced when the non-display area is bent, thereby ensuring reliability of the flexible display device.

DESCRIPTION OF DRAWINGS

The accompanying figures to be used in the description of embodiments of the present disclosure or prior art will be described below to more clearly illustrate the features and technical solutions of the present disclosure. However, the accompanying figures described below are only for reference and illustration but are not for limiting the present disclosure.

DETAILED DESCRIPTION

In order to further illustrate the technical means and effects used to achieve the intended purpose of the present disclosure, they are described in detail below in conjunction with drawings and preferred embodiments.

Figure 1:
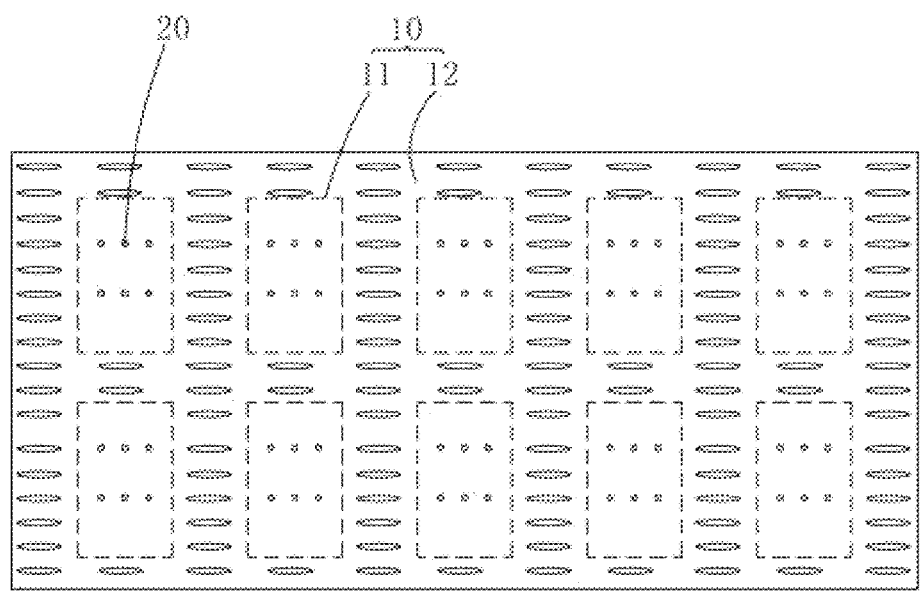
FIG. 1 is a partial top view showing a flexible substrate provided by a first embodiment of the present disclosure.
Figure 2:
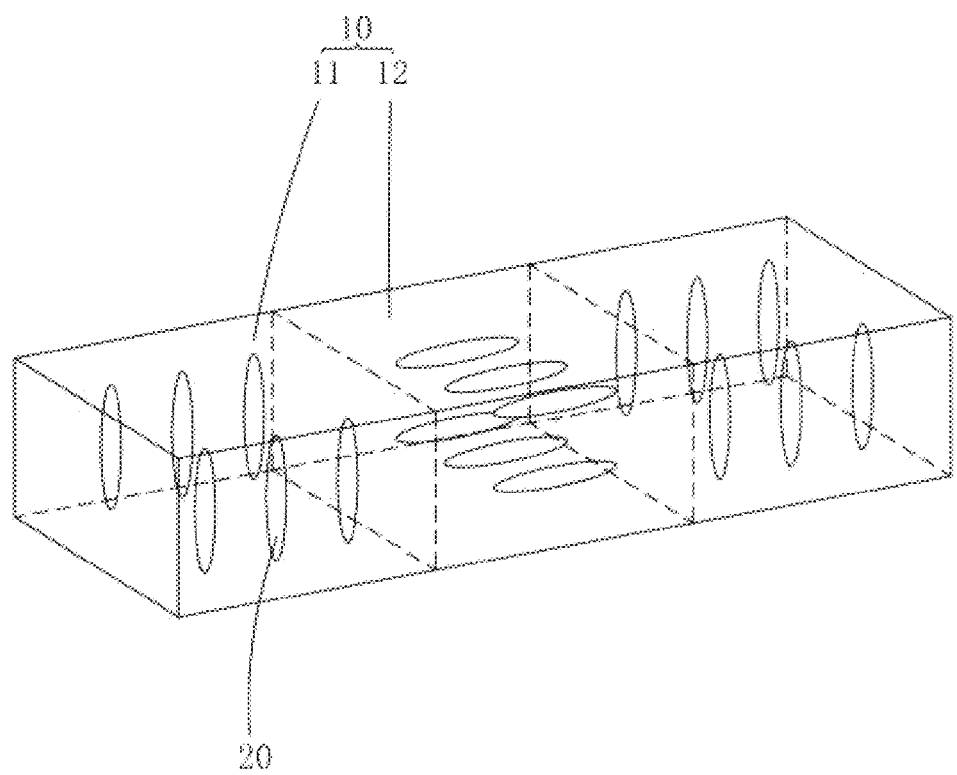
FIG. 2 is a partial perspective view showing the flexible substrate provided by the first embodiment of the present disclosure.
Figure 3:
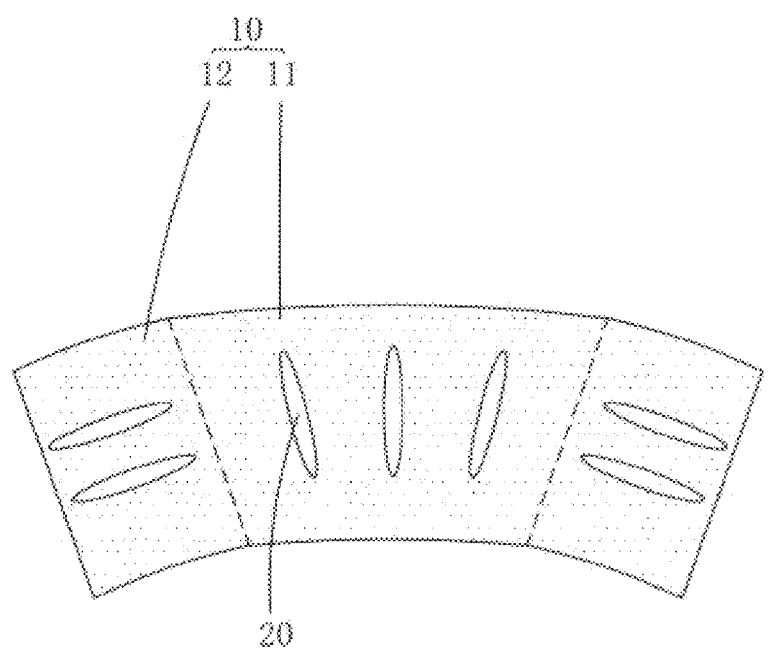
FIG. 3 is a partial schematic view showing the flexible substrate during bending provided by the first embodiment of the present disclosure.

Referring to FIG. 1 to FIG. 3, a flexible substrate provided by a first embodiment of the present disclosure includes a cell 10 and a plurality of liquid crystal molecules 20 disposed in the cell 10. The cell 10 includes a plurality of sub-pixel display areas 11 arranged in an array and a non-display area 12 disposed outside of the sub-pixel display areas 11. The liquid crystal molecules 20 are disposed in each of the sub-pixel display areas 11 and the non-display area 12. Extending directions of the liquid crystal molecules 20 in each of the sub-pixel display areas 11 are perpendicular to a plane on which the flexible substrate is disposed. Extending directions of the liquid crystal molecules 20 in the non-display area 12 are parallel to the plane on which the flexible substrate is disposed.

Specifically, the flexible substrate is applied to a flexible display device, the sub-pixel display areas 11 in the flexible substrate correspond to sub-pixels, which are configured to display images, in the flexible substrate, and the non-display area 12 in the flexible substrate corresponds to areas in the flexible display device where electrically driven devices and wires are disposed.

Furthermore, the flexible substrate can be used as a substrate of an array substrate or a substrate of a color filter substrate in flexible liquid crystal display (LCD) devices, and can also be used as other substrates of conventional flexible LCD devices. The flexible substrate can also be used as a substrate or a cover plate which forms a thin film transistor array substrate and organic light-emitting diode (OLED) devices in flexible OLED display devices, and can also be used as other substrates of conventional flexible OLED devices.

Specifically, a material of the cell 10 includes a polymer consisting of a plurality of reactive monomers, a plurality of intermediates, and a plurality of photoinitiators.

Specifically, referring to FIG. 1 and FIG. 2, in the first embodiment of the present disclosure, extending directions of the liquid crystal molecules 20 in the non-display area 12 are parallel to a row direction of the sub-pixel display areas 11. Layers with liquid crystal molecules have relatively low deformation along extending directions of liquid crystal molecules because of a structural property of liquid crystal molecules. Referring to FIG. 3, the first embodiment of the present disclosure is suitable for a situation in which most of the bending processes are operated horizontally (a row direction of the sub-pixel display areas 11). When the flexible substrate of the first embodiment is stretched along the row direction of the sub-pixel display areas 11, since the extending directions of the liquid crystal molecules 20 in the non-display area 12 are parallel to the row direction of the sub-pixel display areas 11, deformation of the non-display area 12 is relatively low. Therefore, deformations of electrically driven devices and wires that are disposed correspondingly to the non-display area 12 are reduced, thereby preventing the electrically driven devices and wires from being damaged because of bending, and reliability of the flexible display device is improved. In addition, because extending directions of the liquid crystal molecules 20 in the sub-pixel display areas 11 are parallel to a plane where the flexible substrate is disposed as well, the sub-pixel display areas 11 have strong flexibility whether the flexible substrate is stretched along the row direction or the column direction of the sub-pixel display areas 11. As a result, forces applied to the flexible display device can be alleviated so that an issue of alignment abnormality caused by an overly large deformation in partial flexible display device can be solved, and a light leakage problem can be solved as well. Furthermore, if the first embodiment of the present disclosure is applied to flexible LCD devices, the row direction of the sub-pixel display areas 11 needs to be parallel to a polarization axis of a bottom polarizer because the bottom polarizer and a top polarizer are respectively disposed on a light-incident side and a light-emitting side of the flexible LCD devices. Therefore, the extending directions of the liquid crystal molecules 20 in the non-display area 12 are parallel to the polarization axis of the bottom polarizer, and by cooperating with the extending directions of the liquid crystal molecules 20 in the sub-pixel display areas 11 perpendicular to the plane where the flexible substrate is disposed, phase delay amount of the entire flexible substrate can be zero so that the flexible LCD devices can display normally.

Figure 4:
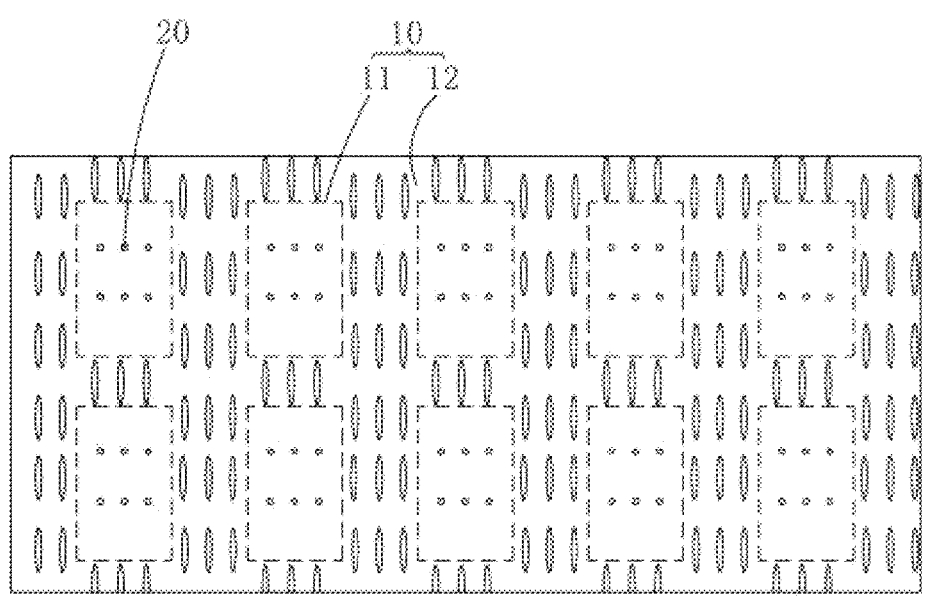
FIG. 4 is a partial top view showing a flexible substrate provided by a second embodiment of the present disclosure.
Figure 5:
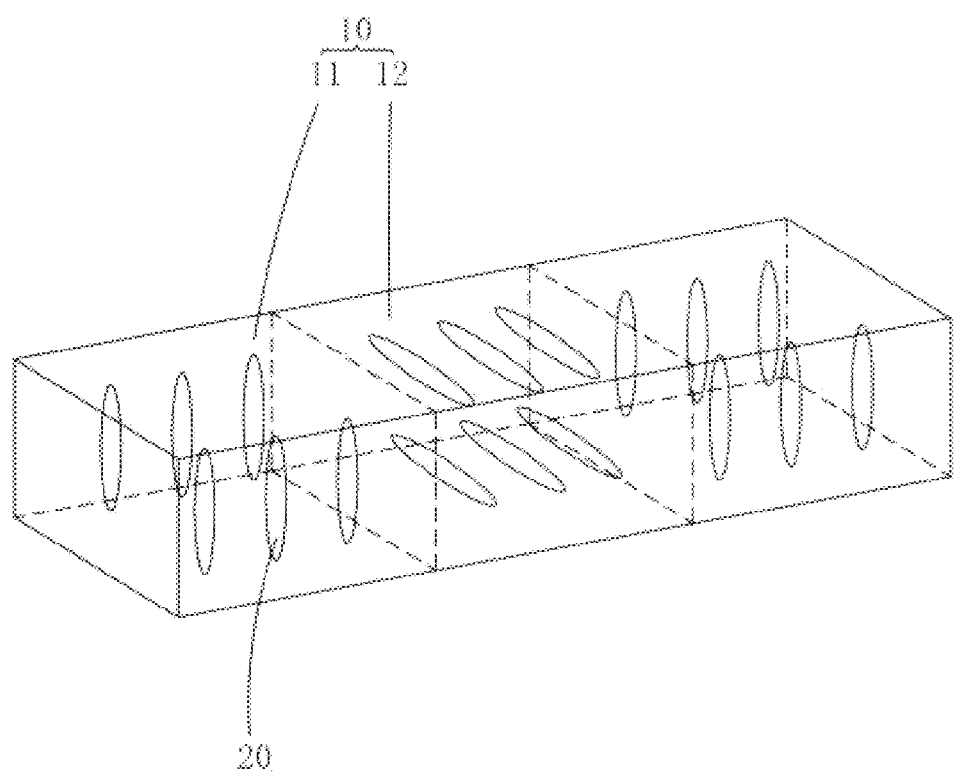
FIG. 5 is a partial perspective view showing the flexible substrate provided by the second embodiment of the present disclosure.

Referring to FIG. 4 and FIG. 5, different from the above first embodiment, in a second embodiment, extending directions of the liquid crystal molecules 20 in the non-display area 12 are parallel to a column direction of sub-pixel display areas 11. Other features in the second embodiment are same as that in the first embodiment and are not described again here.

The second embodiment of the present disclosure is suitable for a situation in which most of the bending processes are operated vertically (a column direction of the sub-pixel display areas 11). When the flexible substrate of the second embodiment is stretched along the column direction of the sub-pixel display areas 11, since the extending directions of the liquid crystal molecules 20 in the non-display area 12 are parallel to the column direction of the sub-pixel display areas 11, deformation of the non-display area 12 is relatively low. Therefore, deformations of electrically driven devices and wires that are disposed correspondingly to the non-display area 12 are reduced, thereby preventing the electrically driven devices and wires from being damaged because of bending, and reliability of the flexible display device is improved. In addition, because extending directions of the liquid crystal molecules 20 in the sub-pixel display areas 11 are parallel to a plane where the flexible substrate is disposed as well, the sub-pixel display areas 11 have strong flexibility whether the flexible substrate is stretched along the row direction or the column direction of the sub-pixel display areas. As a result, forces applied to the flexible display device can be alleviated so that an issue of alignment abnormality caused by an overly large deformation in partial flexible display device can be solved, and a light leakage problem can be solved as well. Furthermore, if the second embodiment of the present disclosure is applied to flexible LCD devices, the column direction of the sub-pixel display areas 11 needs to be parallel to a polarization axis of a bottom polarizer because the bottom polarizer and a top polarizer are respectively disposed on a light-incident side and a light-emitting side of the flexible LCD devices. Therefore, the extending directions of the liquid crystal molecules 20 in the non-display area 12 are parallel to the polarization axis of the bottom polarizer, and by cooperating with the extending directions of the liquid crystal molecules 20 in the sub-pixel display areas 11 perpendicular to the plane where the flexible substrate is disposed, phase delay amount of the entire flexible substrate can be zero so that the flexible LCD devices can display normally.

Figure 6:
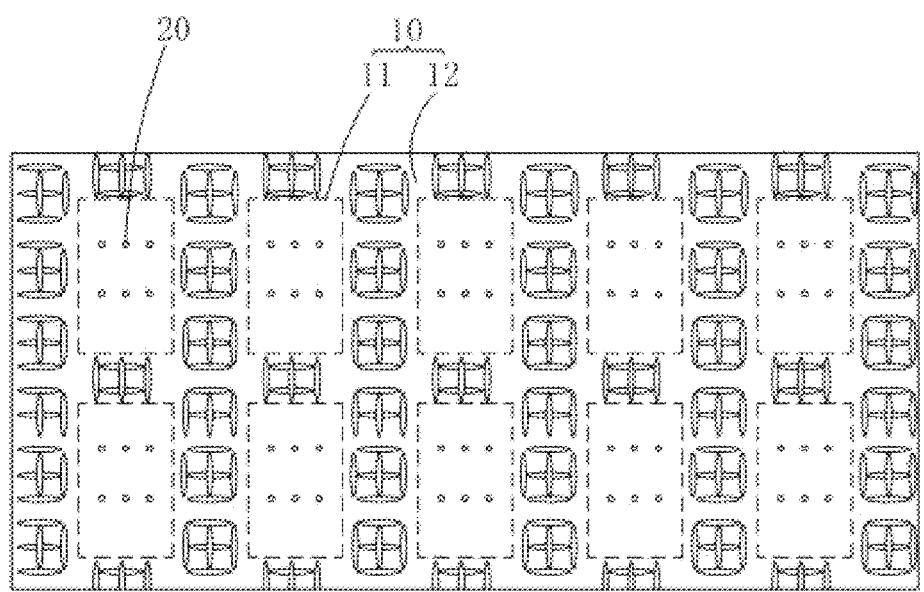
FIG. 6 is a partial top view showing a flexible substrate provided by a third embodiment of the present disclosure.
Figure 7:
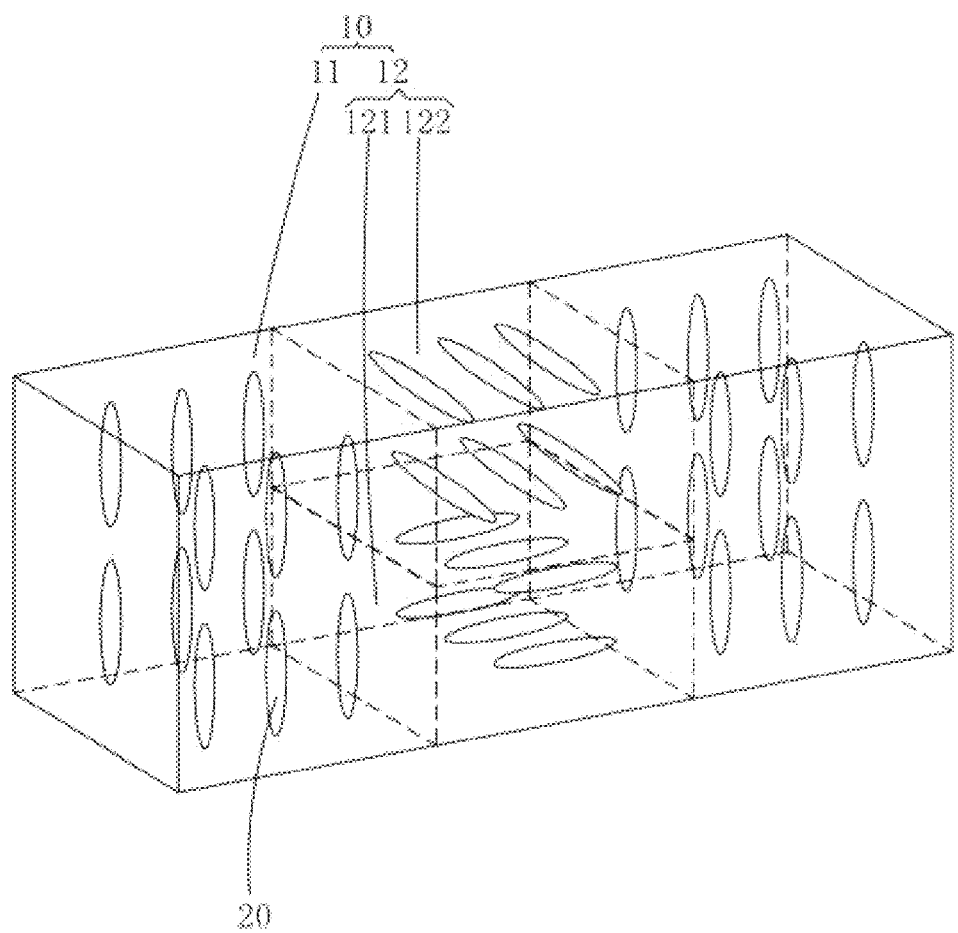
FIG. 7 is a partial perspective view showing the flexible substrate provided by the third embodiment of the present disclosure.

Referring to FIG. 6 and FIG. 7, different from the first embodiment, in a flexible substrate provided by the third embodiment, the non-display area 12 includes a first sub-area 121 and a second sub-area 122 which are sequentially disposed along a direction perpendicular a plane where the flexible substrate is disposed. The liquid crystal molecules 20 are disposed in both the first sub-area 121 and the second sub-area 122. Extending directions of the liquid crystal molecules 20 in the first sub-area 121 are parallel to a row direction of the sub-pixel display areas 11, and extending directions of the liquid crystal molecules 20 in the second sub-area 121 are parallel to a column direction of the sub-pixel display areas 11. Other features in the third embodiments are same as that in the first embodiment and are not described again here.

The third embodiment of the present disclosure is suitable for a situation in which the bending processes are operated in random directions. Since the extending directions of the liquid crystal molecules 20 in the first sub-area 121 are parallel to the row direction of the sub-pixel display areas 11, and the extending directions of the liquid crystal molecules 20 in the second sub-area 122 are parallel to the column direction of the sub-pixel display areas 11, deformation of the non-display area 12 is relatively low whether the flexible substrate of the third embodiment is stretched along the row direction or the column direction of the sub-pixel display areas 11. Therefore, deformations of electrically driven devices and wires that are disposed correspondingly to the non-display area 12 are reduced, thereby preventing the electrically driven devices and wires from being damaged because of bending, and reliability of the flexible display device is improved. Meanwhile, because extending directions of the liquid crystal molecules 20 in the sub-pixel display areas 11 are parallel to a plane where the flexible substrate is disposed, the sub-pixel display areas 11 have strong flexibility whether the flexible substrate is stretched along the row direction or the column direction of the sub-pixel display areas 11. As a result, forces applied to the flexible display device can be alleviated so that an issue of alignment abnormality caused by an overly large deformation in partial flexible display device can be solved, and a light leakage problem can be solved as well.

Figure 8:
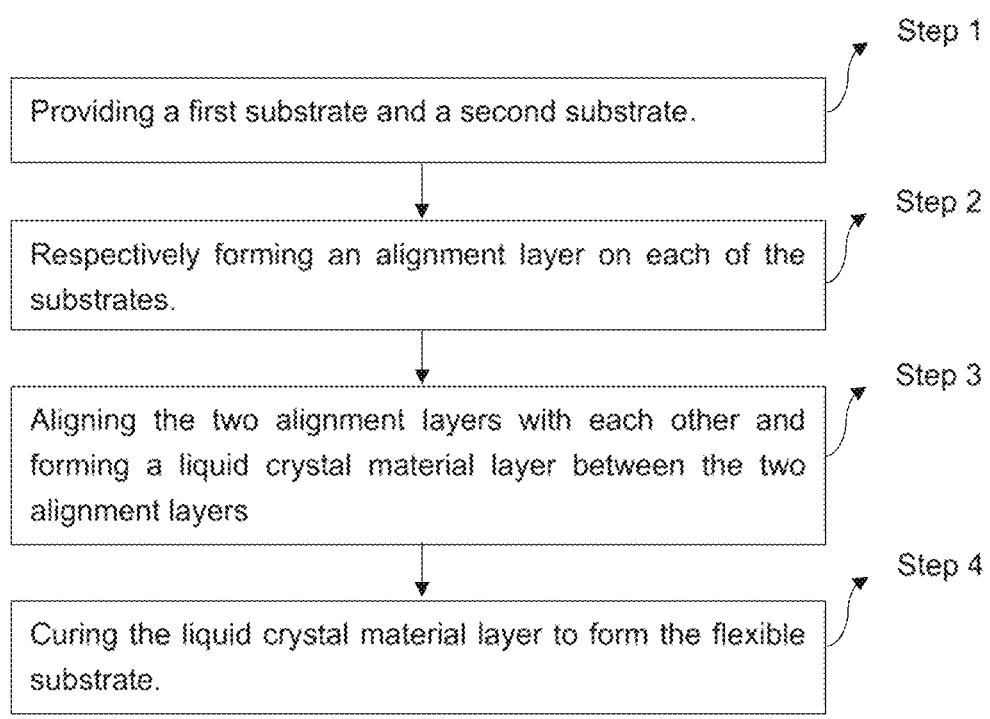
FIG. 8 is a flowchart showing a method of manufacturing the flexible substrate provided by the first embodiment of the present disclosure.
Figure 9:
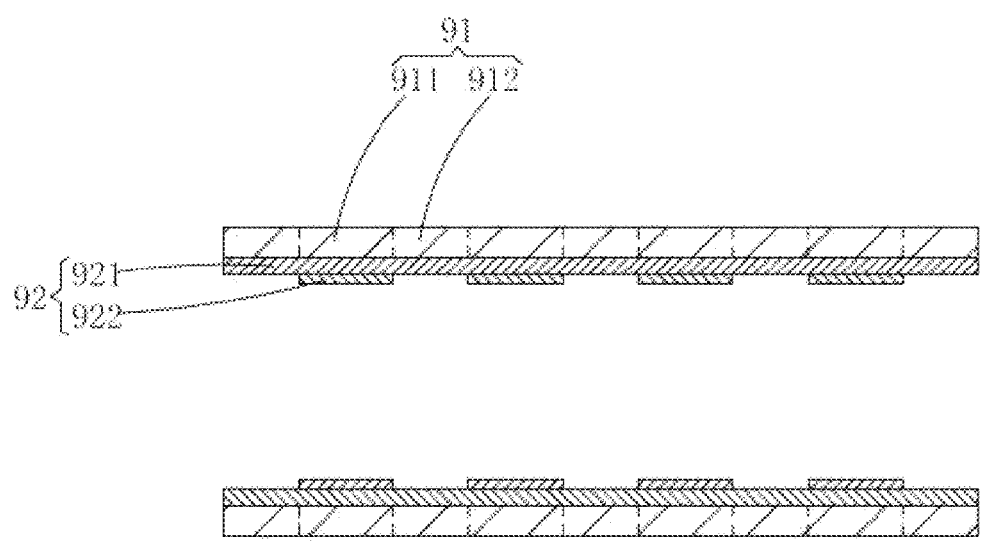
FIG. 9 is a schematic view showing the flexible substrate manufactured by the method during step 1 and step 2 provided by the first embodiment of the present disclosure.

Based on the same idea, referring to FIG. 8, the present disclosure further provides a method of manufacturing the above flexible substrate, including the following steps:

Step 1: referring to FIG. 9, providing two substrates 91. Each of the substrates 91 includes a plurality of vertical alignment areas 911 arranged in an array and a plurality of horizontal alignment areas 912 disposed outside the vertical alignment areas 911. The vertical alignment areas 911 respectively correspond to a plurality of the sub-display areas 11 of a flexible substrate to be formed, and the horizontal alignment areas 912 correspond to a non-display area 12 of the flexible substrate to be formed.

Specifically, materials of the two substrates 91 may be glass.

Step 2: referring to FIG. 9, respectively forming an alignment layer 92 on each of the substrates 91. The alignment layer 92 includes a first sub-alignment layer 921 and a second sub-alignment layer 922 which are sequentially disposed along a direction away from the substrate 91 on which they are disposed. The first sub-alignment layer 921 corresponds to the vertical alignment areas 911 and the horizontal alignment areas 912. The second sub-alignment layer 922 corresponds to the vertical alignment areas 911. The second sub-alignment layer 922 is a vertical alignment layer, and the first sub-alignment layer 921 is a horizontal alignment layer. Alternatively, the second sub-alignment layer 922 corresponds to the horizontal alignment areas 911, the second sub-alignment layer 922 is a horizontal alignment layer, and the first sub-alignment layer 921 is a vertical alignment layer. As shown in FIG. 9, the second sub-alignment layer 922 corresponds to the vertical alignment areas 911. The second sub-alignment layer 922 is a vertical alignment layer, and the first sub-alignment layer 921 is a horizontal alignment layer.

Specifically, the first sub-alignment layer 921 is formed by a coating process and a thermal curing process.

Specifically, the second sub-alignment layer 922 is formed by inkjet printing and a thermal curing process.

Specifically, materials of the first sub-alignment layer 921 and the second sub-alignment layer 922 are polyimide (PI).

Figure 10:
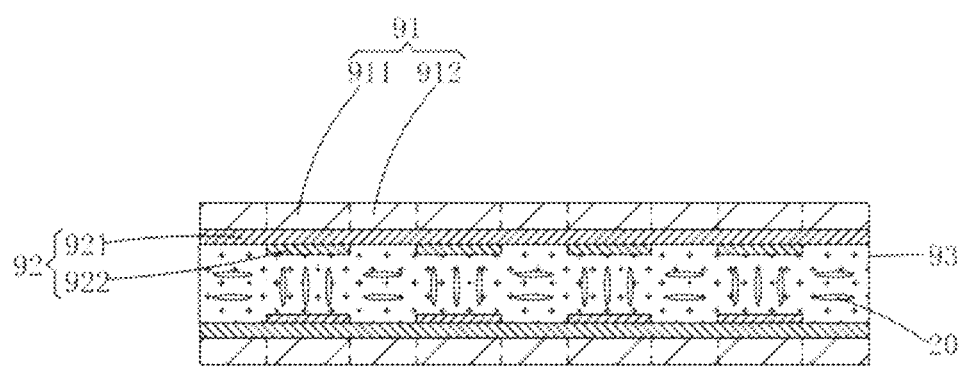
FIG. 10 is a schematic view showing the flexible substrate manufactured by the method during step 3 provided by the first embodiment of the present disclosure.

Step 3: referring to FIG. 10, aligning the two alignment layers 92 with each other, and forming a liquid crystal material layer 93 between the two alignment layers 92. The liquid crystal material layer 93 includes a plurality of liquid crystal molecules 20. By the two alignment layers 92, in the liquid crystal material layer 93, extending directions of the liquid crystal molecules 20 corresponding to the vertical alignment areas 911 are perpendicular to planes on which the substrates 91 are respectively disposed, and extending directions of the liquid crystal molecules 20 corresponding to the horizontal alignment areas 912 are parallel to the planes on which the substrates 91 are respectively disposed.

Specifically, the liquid crystal material layer 93 further includes a plurality of reactive monomers, a plurality of intermediates, and a plurality of photoinitiators.

Furthermore, the reactive monomers are reactive liquid crystal monomers, and the intermediates are N-butylamine.

Specifically, in the step 3, the liquid crystal material layer 93 is further encapsulated after it is formed.

Figure 11:
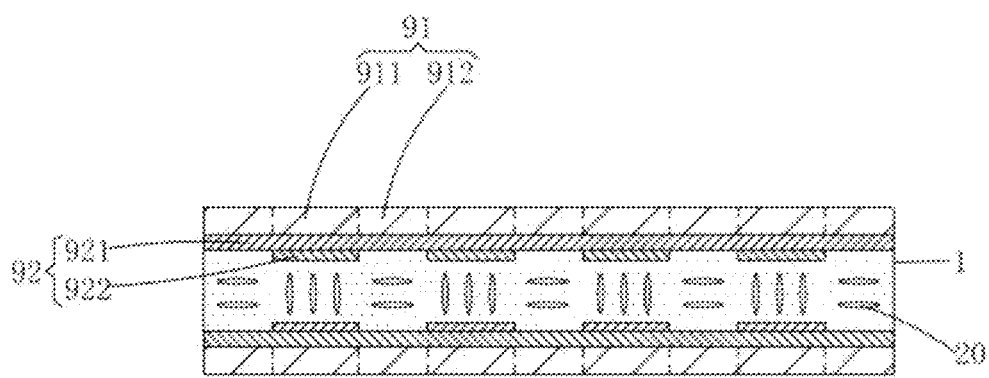
FIG. 11 is a schematic view showing the flexible substrate manufactured by the method during step 4 provided by the first embodiment of the present disclosure.

Step 4: referring to FIG. 11, curing the liquid crystal material layer 93 to form a flexible substrate 1.

Specifically, the step of curing the liquid crystal material layer 93 in the step 4 includes: first heating the liquid crystal material layer 93 at predetermined temperatures for a predetermined time, then irradiating the liquid crystal material layer 93 by ultraviolet light to start polymerization of the reactive monomers, the intermediates, and the photoinitiators.

Preferably, the predetermined temperatures range from 70° C. to 100° C., and the predetermined time ranges from 15 hours to 30 hours.

Step 5: separating the flexible substrate 1 from the two alignment layers 92.

Figure 12:
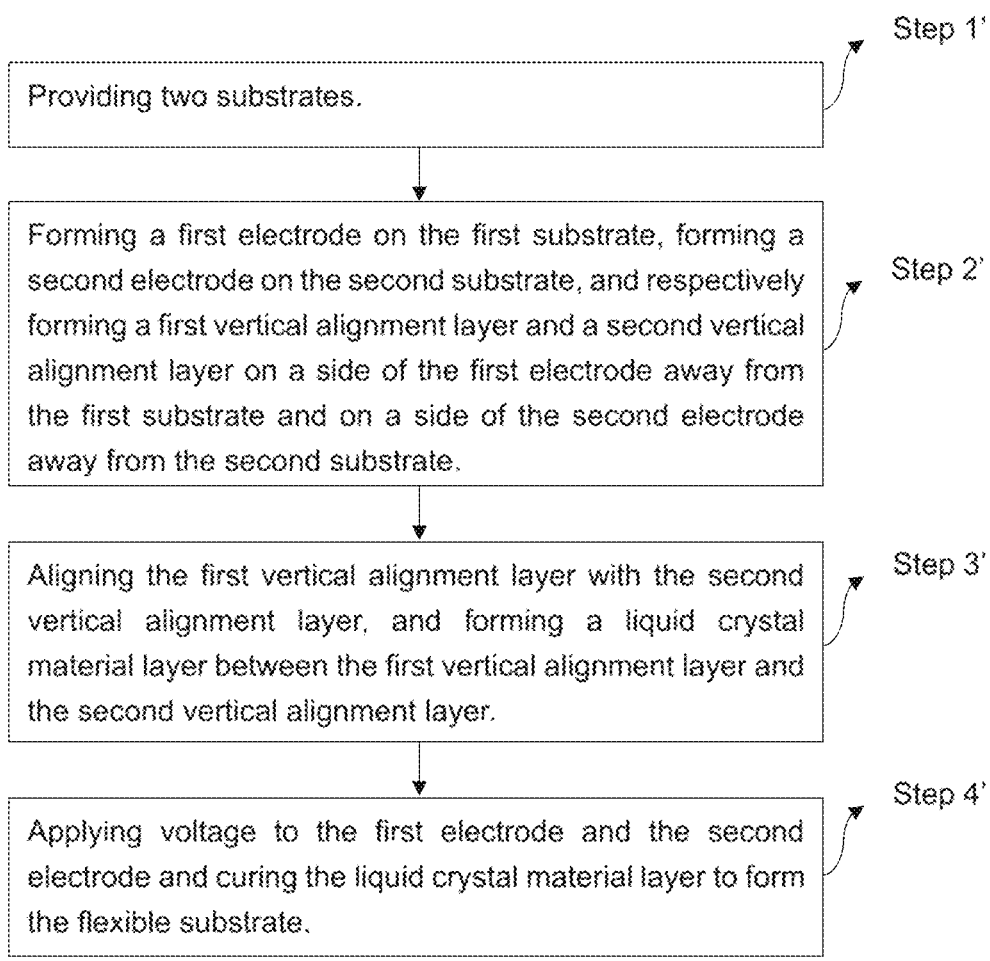
FIG. 12 is a flowchart showing a method of manufacturing the flexible substrate provided by the second embodiment of the present disclosure.

Referring to FIG. 12, the present disclosure further provides a manufacturing method of the above flexible substrate, including the following steps:

Step 1': providing a first substrate 91' and a second substrate 92'. The first substrate 91' includes a plurality of vertical alignment areas 911' arranged in an array and a plurality of horizontal alignment areas 912' disposed outside the vertical alignment areas 911'

The vertical alignment areas 911' respectively correspond to a plurality of the sub-display areas 11 of a flexible substrate to be formed, and the horizontal alignment areas 912' correspond to a non-display area 12 of the flexible substrate to be formed.

Specifically, materials of the first substrate 91' and the second substrate 92' may be glass.

Figure 13:
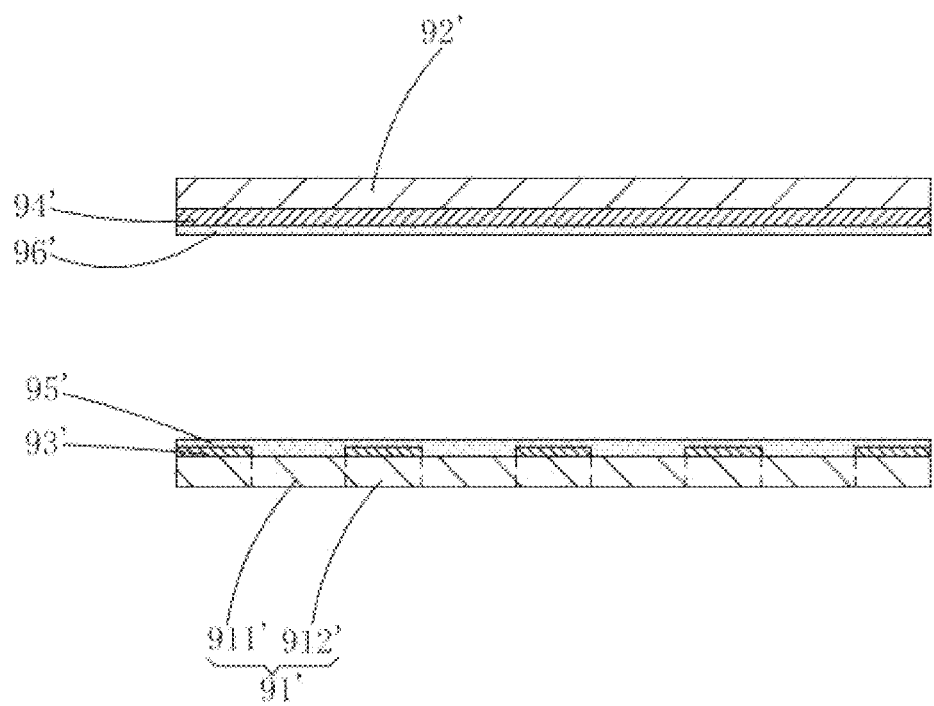
FIG. 13 is a schematic view showing the flexible substrate manufactured by the method during step 1' and step 2' provided by the second embodiment of the present disclosure.

Step 2': referring to FIG. 13, forming a first electrode 93' on the first substrate 91', forming a second electrode 94' on the second substrate 92', and respectively forming a first vertical alignment layer 95' and a second vertical alignment layer 96' on a side of the first electrode 93' away from the first substrate 91' and on a side of the second electrode 94' away from the second substrate 92'. The first electrode 93' corresponds to the horizontal alignment areas 912', the second electrode 94' corresponds to the horizontal alignment areas 912', and the first vertical alignment layer 95' and the second vertical alignment layer 96' correspond to the vertical alignment areas 911'. Referring to FIG. 13, the second electrode 94', the first vertical alignment layer 95', and the second vertical alignment layer 96' are plane structures and correspond to the vertical alignment areas 911' and the horizontal alignment areas 912'.

Specifically, the first vertical alignment layer 95' and the second vertical alignment layer 96' are formed by a coating process and a thermal curing process.

Specifically, materials of the first vertical alignment layer 95' and the second vertical alignment layer 96' are polyimide (PI).

Figure 14:
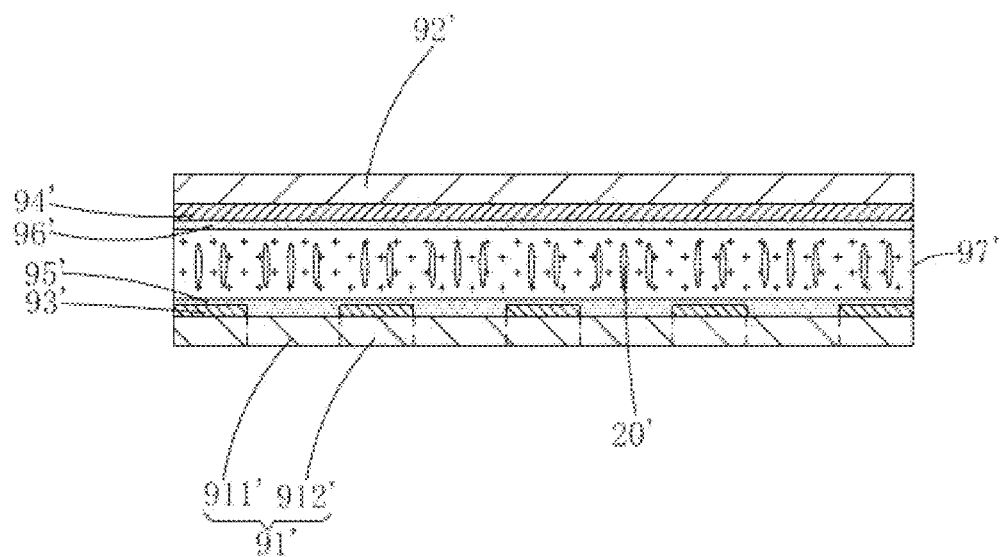
FIG. 14 is a schematic view showing the flexible substrate manufactured by the method during step 3' provided by the second embodiment of the present disclosure.

Step 3': referring to FIG. 14, aligning the first vertical alignment layer 95' with the second vertical alignment layer 96', and forming a liquid crystal material layer 97' between the first vertical alignment layer 95' and the second vertical alignment layer 96', wherein the liquid crystal material layer 97' includes a plurality of liquid crystal molecules 20' which are negative liquid crystal molecules.

Specifically, the liquid crystal material layer 97' further includes a plurality of reactive monomers, a plurality of intermediates, and a plurality of photoinitiators.

Figure 15:
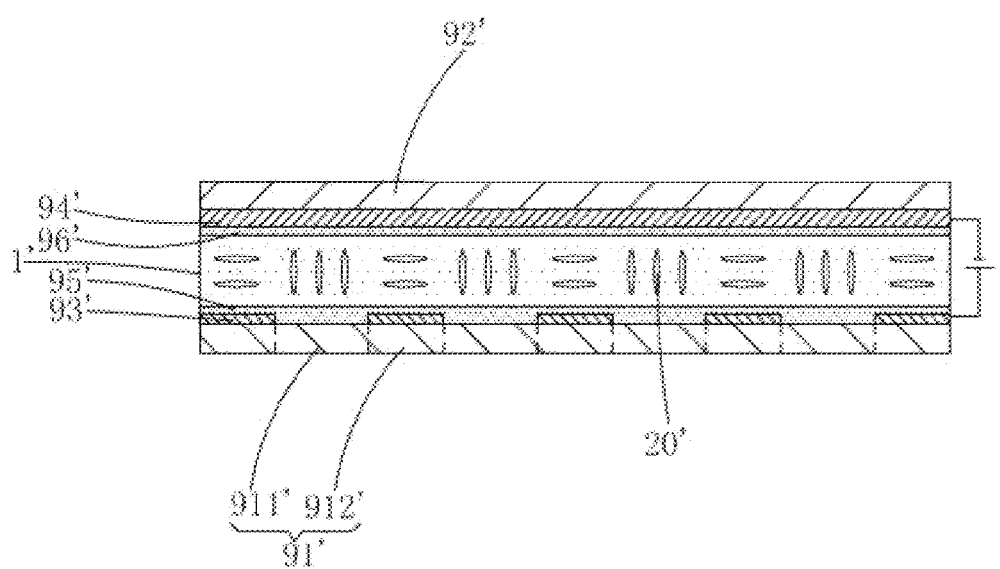
FIG. 15 is a schematic view showing the flexible substrate manufactured by the method during step 4' provided by the second embodiment of the present disclosure.

Step 4': referring to FIG. 15, applying a voltage to the first electrode 93' and the second electrode 94' and curing the liquid crystal material layer 97' to form a flexible substrate 1', wherein by the first vertical alignment layer 95', the second vertical alignment layer 96', and an electric field between the first electrode 93' and the second electrode 94', extending directions of the liquid crystal molecules 20' in the liquid crystal material layer 97' corresponding to the vertical alignment areas 911' are perpendicular to a plane on which the first substrate 91' is disposed, and extending directions of the liquid crystal molecules 20' in the liquid crystal material layer 97' corresponding to the horizontal alignment areas 912' are parallel to the plane on which first substrate 91' is disposed.

Specifically, the step of curing the liquid crystal material layer 97' in the Step 4' includes: first irradiating the liquid crystal material layer 97' by ultraviolet light to start polymerization of the reactive monomers, the intermediates, and the photoinitiators, then heating the liquid crystal material layer 97' at predetermined temperatures for a predetermined time.

Preferably, the predetermined temperatures range from 70° C. to 100° C., and the predetermined time ranges from 15 hours to 30 hours.

Step 5': separating the flexible substrate 1' from the first vertical alignment layer 95' and the second vertical alignment layer 96'.

Based on the same idea, the present disclosure further provides a flexible display device, including the above flexible substrate.

Specifically, the flexible display device may be an LCD device. The flexible substrate may be a substrate of an array substrate or a substrate of a color filter substrate in the LCD device, or may also be other substrates of conventional flexible LCD devices.

Specifically, the flexible display device may also an OLED display device. The flexible substrate may be a substrate or a cover plate which forms a thin film transistor array substrate and organic light-emitting diode (OLED) devices in the OLED display device, and may also other substrates of conventional flexible OLED devices.

It should be noted that the flexible display device provided by the present disclosure includes the above flexible substrate. Therefore, deformation of the non-display area 12 is relatively low when the flexible display device is bent. As a result, deformations of electrically driven devices and wires that are disposed correspondingly to the non-display area 12 are reduced, thereby preventing the electrically driven devices and wires from being damaged because of bending, and reliability of the flexible display device is improved. Meanwhile, the sub-pixel display areas 11 have strong flexibility so that forces applied to the flexible display device can be alleviated. As a result, an issue of alignment abnormality caused by an overly large deformation in partial flexible display device can be solved, and a light leakage problem can be solved as well.

To sum up, the present disclosure provides a flexible substrate, including a cell and a plurality of liquid crystal molecules disposed in the cell, wherein the cell includes a plurality of sub-pixel display areas arranged in an array and a non-display area disposed outside the sub-pixel display areas. The liquid crystal molecules are disposed in each of the sub-pixel display areas and the non-display area. Extending directions of the liquid crystal molecules in each of the sub-pixel display areas are perpendicular to a plane on which the flexible substrate is disposed, and extending directions of the liquid crystal molecules in the non-display area are parallel to the plane on which the flexible substrate is disposed. Therefore, bendability of the non-display area in the flexible substrate is improved, and flexibility of the sub-pixel display area is improved as well, which may effectively reduce deformation of the non-display area when the non-display area is bent. Risk of damage to electrically driven devices in a flexible display device having the flexible substrate can be reduced when the flexible display device is bent. As a result, reliability of products is improved. The present disclosure provides a manufacturing method of the flexible substrate, and deformation of the non-display area in the flexible display device having the flexible substrate can be reduced when the non-display area is bent, thereby ensuring reliability of the flexible display device. The present disclosure provides the flexible display device, and deformation of the non-display area can be reduced when the non-display area is bent, thereby ensuring reliability of the flexible display device.

In summary, many changes and modifications to the described embodiment can be carried out by those skilled in the art, and all such changes and modifications are intended to be included within the scope of the appended claims.

What is claimed is:

1. A flexible substrate, comprising a cell and a plurality of liquid crystal molecules disposed in the cell;
   wherein the cell comprises a plurality of sub-pixel display areas arranged in an array and a non-display area disposed outside the sub-pixel display areas;
   the liquid crystal molecules are disposed in each of the sub-pixel display areas and the non-display area;
   extending directions of the liquid crystal molecules in each of the sub-pixel display areas are perpendicular to a plane on which the flexible substrate is disposed; and
   extending directions of the liquid crystal molecules in the non-display area are parallel to the plane on which the flexible substrate is disposed;
   wherein the non-display area comprises a first sub-area and a second sub-area which are sequentially disposed along a direction perpendicular to the plane on which the flexible substrate is disposed;
   the liquid crystal molecules are disposed in the first sub-area and the second sub-area;
   extending directions of the liquid crystal molecules in the first sub-area are parallel to a row direction of the sub-pixel display areas; and
   extending directions of the liquid crystal molecules in the second sub-area are parallel to a column direction of the sub-pixel display areas.

2. The flexible substrate of claim 1, wherein the extending directions of the liquid crystal molecules in the non-display area are parallel to a row direction or a column direction of the sub-pixel display areas.

3. The flexible substrate of claim 1, wherein a material of the cell is a polymer.

4. A method of manufacturing the flexible substrate of claim 1, comprising the following steps:
   Step 1: providing two substrates, wherein each of the substrates comprises a plurality of vertical alignment areas arranged in an array and a plurality of horizontal alignment areas disposed outside the vertical alignment areas;
   Step 2: respectively forming an alignment layer on each of the substrates, wherein the alignment layer comprises a first sub-alignment layer and a second sub-alignment layer which are sequentially disposed along a direction away from the substrate on which they are disposed, and the first sub-alignment layer corresponds to the vertical alignment areas and the horizontal alignment areas; and
   the second sub-alignment layer corresponds to the vertical alignment areas, and the second sub-alignment layer is a vertical alignment layer and the first sub-alignment layer is a horizontal alignment layer; or
   the second sub-alignment layer corresponds to the horizontal alignment areas, and the second sub-alignment layer is the horizontal alignment layer and the first sub-alignment layer is the vertical alignment layer;
   Step 3: aligning the two alignment layers with each other, and forming a liquid crystal material layer between the two alignment layers, wherein the liquid crystal material layer comprises a plurality of liquid crystal molecules;
   by the two alignment layers, in the liquid crystal material layer, extending directions of the liquid crystal molecules corresponding to the vertical alignment areas are perpendicular to planes on which the substrates are respectively disposed, and extending directions of the liquid crystal molecules corresponding to the horizontal alignment areas are parallel to the planes on which the substrates are respectively disposed; and
   Step 4: curing the liquid crystal material layer to form the flexible substrate.

5. The method of claim 4, wherein the method further comprises:
   Step 5: separating the flexible substrate from the two alignment layers;
   wherein the liquid crystal material layer further comprises a plurality of reactive monomers, a plurality of intermediates, and a plurality of photoinitiators;
   the step of curing the liquid crystal material layer in the Step 4 comprises:
   first heating the liquid crystal material layer at predetermined temperatures for predetermined times, then irradiating the liquid crystal material layer by ultraviolet light;
   the predetermined temperatures range from 70° C. to 100° C., and the predetermined times range from 15 hours to 30 hours; and
   the second sub-alignment layer is formed by inkjet printing.

6. A method of manufacturing the flexible substrate of claim 1, comprising the following steps:
   Step 1': providing a first substrate and a second substrate, wherein the first substrate comprises a plurality of vertical alignment areas arranged in an array and a plurality of horizontal alignment areas disposed outside the vertical alignment areas;
   Step 2': forming a first electrode on the first substrate, forming a second electrode on the second substrate, and respectively forming a first vertical alignment layer and a second vertical alignment layer on a side of the first electrode away from the first substrate and on a side of the second electrode away from the second substrate, wherein the first electrode corresponds to the horizontal alignment areas, the second electrode corresponds to the horizontal alignment areas, and both the first vertical alignment layer and the second vertical alignment layer correspond to the vertical alignment areas;
   Step 3': aligning the first vertical alignment layer with the second vertical alignment layer, and forming a liquid crystal material layer between the first vertical alignment layer and the second vertical alignment layer, wherein the liquid crystal material layer comprises a plurality of liquid crystal molecules that are negative liquid crystal molecules; and
   Step 4': applying voltage to the first electrode and the second electrode and curing the liquid crystal material layer to form the flexible substrate, wherein by the first vertical alignment layer, the second vertical alignment layer, and an electric field between the first electrode and the second electrode, extending directions of the liquid crystal molecules in the liquid crystal material layer corresponding to the vertical alignment areas are perpendicular to a plane on which the first substrate is disposed, extending directions of the liquid crystal molecules in the liquid crystal material layer corresponding to the horizontal alignment areas are parallel to the plane on which the first substrate is disposed.

7. The method of claim 6, wherein the method further comprises:
- Step 5': separating the flexible substrate from the first vertical alignment layer and the second vertical alignment layer;
- wherein the liquid crystal material layer comprises a plurality of reactive monomers, a plurality of intermediates, and a plurality of photoinitiators;
- the step of curing the liquid crystal material layer in the step 4' comprises:
- first irradiating the liquid crystal material layer by ultraviolet light, then heating the liquid crystal material layer at predetermined temperatures for predetermined times; and
- the predetermined temperatures range from 70° C. to 100° C., and the predetermined times range from 15 hours to 30 hours.

8. A flexible display device, comprising the flexible substrate of claim 1.

9. The flexible display device of claim 8, wherein the flexible display device is a liquid crystal display device or an organic light-emitting diode display device.

\* \* \* \* \*